(12) United States Patent
Iwai

(10) Patent No.: US 12,535,702 B2
(45) Date of Patent: Jan. 27, 2026

(54) POWER SUPPLYING STRUCTURE

(71) Applicant: Magnolia White Corporation, Tokyo (JP)

(72) Inventor: Youhei Iwai, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 576 days.

(21) Appl. No.: 17/701,696

(22) Filed: Mar. 23, 2022

(65) Prior Publication Data

US 2022/0334427 A1 Oct. 20, 2022

(30) Foreign Application Priority Data

Apr. 16, 2021 (JP) ................................. 2021-069523

(51) Int. Cl.
- *G02F 1/1333* (2006.01)
- *G02F 1/133* (2006.01)
- *G09G 3/36* (2006.01)
- *G02F 1/13357* (2006.01)

(52) U.S. Cl.
CPC .... *G02F 1/133308* (2013.01); *G02F 1/13306* (2013.01); *G09G 3/36* (2013.01); *G02F 1/133615* (2013.01)

(58) Field of Classification Search
CPC ........... G02F 1/133308; G02F 1/13306; G02F 1/133615; G02F 1/13452; G09G 3/36; G09G 3/32; G09G 2300/043; G09G 2330/02; G09G 2380/10
See application file for complete search history.

(56) References Cited

U.S. PATENT DOCUMENTS

| | | | | |
|---|---|---|---|---|
| 2015/0171649 A1* | 6/2015 | Kim | ...................... | H02J 7/0044 320/114 |
| 2015/0296634 A1* | 10/2015 | Itoh | .......................... | H05K 5/10 361/679.01 |
| 2016/0202786 A1* | 7/2016 | Lee | ........................ | G06F 1/1637 345/173 |

(Continued)

FOREIGN PATENT DOCUMENTS

| | | |
|---|---|---|
| JP | 5019072 B2 | 9/2012 |
| JP | 2014-503835 A | 2/2014 |

(Continued)

*Primary Examiner* — Jennifer D. Carruth
*Assistant Examiner* — Agnes Dobrowolski
(74) *Attorney, Agent, or Firm* — XSENSUS LLP

(57) ABSTRACT

A power supplying structure for a transparent liquid crystal display device attached to a glass slide window which has a window glass and a first frame surrounding the window glass; the glass slide window is disposed in a window frame; in which a display area of the transparent liquid crystal display device overlaps the window glass; an external dimension of the display area of the transparent liquid crystal display device is smaller than an external dimension of the window glass; a light source for supplying light to the display area, a terminal area of the transparent liquid crystal display device, a wiring substrate, and a cable connected to the wiring substrate are housed in the first frame; the cable is connected to a receiving terminal formed in the frame; the receiving terminal can be connected to a power supplying terminal; the power supplying terminal is connected to a power source.

13 Claims, 16 Drawing Sheets

(56) References Cited

U.S. PATENT DOCUMENTS

| | | | |
|---|---|---|---|
| 2016/0357083 A1* | 12/2016 | Brown | E06B 3/67391 |
| 2016/0357294 A1* | 12/2016 | Ozeki | B32B 17/06 |
| 2018/0025679 A1* | 1/2018 | Park | A47F 3/005 |
| | | | 345/156 |
| 2018/0369071 A1* | 12/2018 | Koike | A61J 7/0076 |
| 2019/0221144 A1* | 7/2019 | Artwohl | A47F 3/0434 |
| 2020/0057421 A1* | 2/2020 | Trikha | H10K 50/80 |
| 2021/0286226 A1 | 9/2021 | Sugiyama et al. | |

FOREIGN PATENT DOCUMENTS

| | | | |
|---|---|---|---|
| JP | 2015-209737 A | 11/2015 |
| JP | 2016-50442 A | 4/2016 |
| JP | 2017-513069 A | 5/2017 |
| JP | 2020-91400 A | 6/2020 |

* cited by examiner

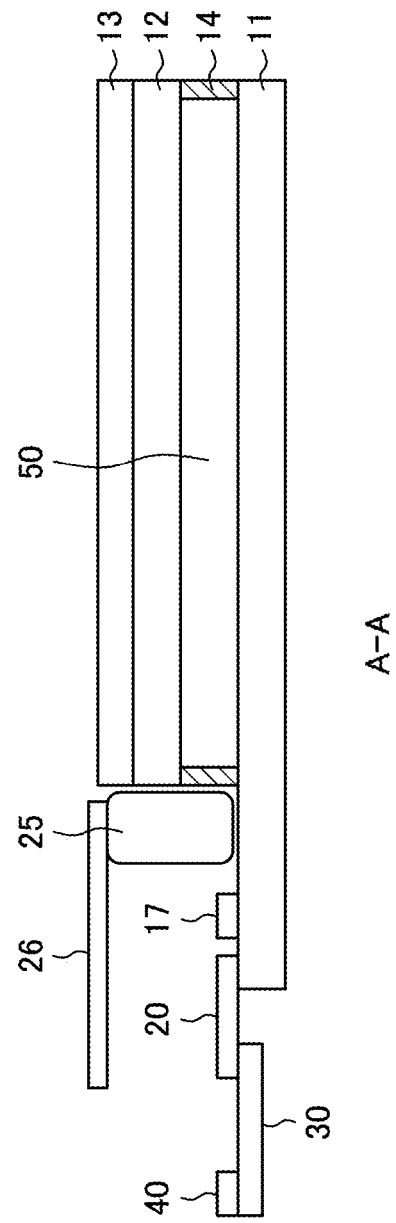

POWER SUPPLYING STRUCTURE

CROSS-REFERENCE TO RELATED APPLICATION

The present application claims priority from Japanese Patent Application JP 2021-069523 filed on Apr. 16, 2021, the content of which is hereby incorporated by reference into this application.

BACKGROUND OF THE INVENTION

(1) Field of the Invention

The present invention relates to a power supplying structure to an electronic device which is installed in a frame of window glass.

(2) Description of the Related Art

There is a system to spread information through a display device adhered to a window glass or a door of a show case and the like. On the other hand, a security system and the like has been developed, in which several sensors or electronic devices are disposed in a frame for a window glass.

Patent document 1 discloses a window for a vehicle in which an outer glass of the vehicle and an inner glass of the vehicle adhered to each other by transparent conductive adhesive and supply power to the transparent conductive adhesive through a terminal. The purpose of the structure of patent document 1 is to provide anti fogging for the window glass of the vehicle.

Patent document 2 discloses a structure in which a display device is adhered to a structural glass plate of a window, a signboard, or a showcase and the like, and an outer size of the display device is smaller than that of the structural window. In patent document 2, power is supplied to the display device by attaching a matt finished cable on the surface of the structural glass.

Patent document 3 discloses a system to inform about a state of unlocking, which does not need a cell for the sensor. In concrete, power is supplied to a sensor for detecting whether a window is locked or unlocked through a noncontact power supply system disposed on the window frame and the frame for the window glass.

Patent documents 4 and 5 disclose to dispose a transparent display device on a door of a showcase of an automatic vendor and the like.

Patent document 6 discloses a liquid crystal display device (transparent display device) using molecular dispersing liquid crystal of side light type, in which light is incident from a side of the display panel.

PRIOR ART REFERENCE

Patent Document

[Patent document 1] Japanese patent No. 5019072
[Patent document 2] Japanese patent application publication 2016-50442
[Patent document 3] Japanese patent application publication 2015-209737
[Patent document 4] Japanese translation of PCT international application 2014-503835
[Patent document 5] Japanese translation of PCT international application 2017-513069
[Patent document 6] Japanese patent application publication 2020-91400

SUMMARY OF THE INVENTION

A system has been developed in which a transparent media is used as a normal glass window when displaying is not necessary, but is used as a display device when displaying is necessary by adhering a transparent display device on the transparent media like glass window. As the transparent display device, a liquid crystal display device or an organic EL display device may be used.

Sometimes it is desired that an outer size of the transparent display is made smaller than an outer size of the window glass. There is also a demand to dispose a plurality of transparent display devices on one window glass. In that case, means to supply power to the transparent display devices becomes a problem. That is to say, cables and the like for supplying power to the transparent display are opaque, thus, when they are adhered to the window glass and the like, design quality is deteriorated.

The present invention solves the above explained problems and realize a structure to attach a transparent display device on a transparent media like glass without deteriorating design as a transparent media.

Concrete means to solve the above problems are as follows.

(1) A power supplying structure for a transparent liquid crystal display device attached to a glass slide window which has a window glass and a first frame surrounding the window glass; the glass slide window being disposed in a window frame; in which a display area of the transparent liquid crystal display device overlaps the window glass; an external dimension of the display area of the transparent liquid crystal display device is smaller than an external dimension of the first window glass; a light source for supplying light to the display area, a terminal area of the transparent liquid crystal display device, a wiring substrate, and a cable connecting to the wiring substrate are housed in the first frame; the cable connects to a receiving terminal formed in the frame; the receiving terminal formed in the window frame is capable of connecting to a power supplying terminal, and the power supplying terminal connects to a power source.

(2) The power supplying structure according to (1); in which a first magnet is attached to the receiving terminal; a second magnet is attached to the power supplying terminal, and a polarity of the first terminal and a polarity of the second terminal are arranged as that the first magnet and the second magnet attract to each other.

(3) The power supplying structure according to (1); in which a thickness of the transparent liquid crystal display device becomes thinner in going to an edge in an opposite direction from the terminal area in a cross sectional view parallel to a sliding direction of the glass slide window.

(4) The power supplying structure according to (1); in which a thickness of the window glass on which the transparent liquid crystal display device is adhered is thinner than a thickness of other area of the window glass.

(5) A power supplying structure for a transparent liquid crystal display device attached to a glass slide window which has two window glasses and a first frame surrounding the two window glasses; the glass slide window being disposed in a window frame; in which a display area of the transparent liquid crystal display device overlaps the two window glasses; an external dimension of the display area of the transparent liquid crystal display device is smaller than an external dimension of the two window glass; a light source for supplying light to the display area, a terminal area of the transparent liquid crystal display device, a wiring substrate, and a cable connecting to the wiring substrate are housed in the first frame; the cable connects to a receiving terminal formed in the frame; the receiving terminal is capable of connecting to a power supplying terminal formed in the window frame, and the power supplying terminal connects to a power source.

(6) A power supplying structure for a transparent liquid crystal display device attached to a glass slide window which has a rectangular window glass and a first frame surrounding the window glass; the glass slide window being disposed in a window frame; in which a display area of the transparent liquid crystal display device overlaps the window glass; an external dimension of the display area of the transparent liquid crystal display device is smaller than an external dimension of the window glass; a light source for supplying light to the display area, a terminal area of the transparent liquid crystal display device, a wiring substrate, and a cable connecting to the wiring substrate are housed in the first frame; the cable connects to a receiving terminal disposed on a top side or a bottom side of the frame; a rail to connect to the receiving terminal is formed on a top side or bottom side of the window frame; the receiving terminal can contact to the rail and slide on the rail, and the rail connects to a power source.

(7) A power supplying structure for a transparent liquid crystal display device attached to a glass slide window which has a rectangular window glass and a first frame surrounding the window glass; the glass slide window being disposed in a window frame; in which a display area of the transparent liquid crystal display device overlaps the window glass; an external dimension of the display area of the transparent liquid crystal display device is smaller than an external dimension of the window glass; a light source for supplying light to the display area, a terminal area of the transparent liquid crystal display device, a wiring substrate, and a cable connecting to the wiring substrate are housed in the first frame; a first receiving terminal disposed on a top side of the first frame, and a second receiving terminal disposed on a bottom side of the first frame; a first end of the cable connects to the first receiving terminal; a second end of the cable connects to the second receiving terminal; a first rail is disposed on a top side of the window frame to connect to the first receiving terminal; the first receiving terminal can contact to the first rail and slide on the first rail; a second rail is disposed on a bottom side of the window frame to connect to the second receiving terminal; the second receiving terminal can contact to the second rail and slide on the second rail, and the first rail and the second rail connect to a power source.

(8) A power supplying structure in which a glass slide window having a window glass and a first frame surrounding the window glass is disposed in a window frame; a plurality of display areas of transparent liquid crystal display devices are adhered to the window glass; terminal areas of the transparent liquid crystal display devices, wiring substrates, and a cable connecting to the wiring substrates are housed in the first frame; the cable is formed as a continuous loop in the first frame; the cable connects to a receiving terminal disposed in the first frame; the receiving terminal connects to a power supplying terminal disposed in the window frame, and the power supplying terminal connects to a power source.

(9) A power supplying structure in which a glass slide window having a window glass and a first frame surrounding the window glass is disposed in a window frame; a plurality of display areas of transparent liquid crystal display devices are adhered to the window glass; terminal areas of the transparent liquid crystal display devices, wiring substrates, and a cable connecting to the wiring substrates are housed in the first frame; the cable is formed as a continuous loop in the first frame; the cable connects to a receiving terminal disposed in the first frame; the receiving terminal connects to the power supplying terminal disposed in the window frame, and the power supplying terminal connects to a power source; in which the plurality of the display areas of the transparent liquid crystal display devices are adhered to the window glass with a certain space to each other, and the certain space is covered by a dummy frame.

BRIEF DESCRIPTION OF THE DRAWINGS

FIG. 2 is a cross sectional view of FIG. 1A along the line A-A.

DETAILED DESCRIPTION OF THE PREFERRED EMBODIMENTS

The present invention is explained in detail by the following embodiments.

Figure 1A:
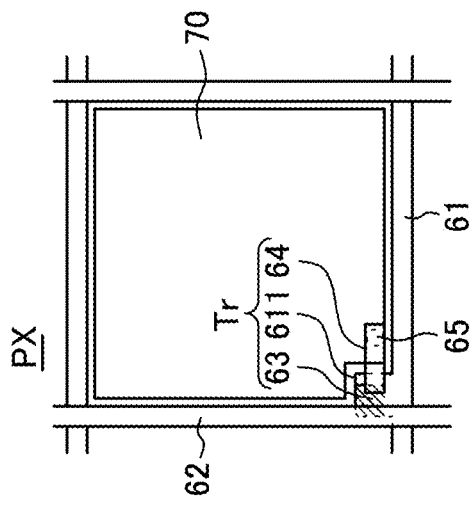
FIG. 1A is a plan view of a liquid crystal display device.

A transparent display device which is to be adhered to a transparent media as window glass can be constituted by a liquid crystal display device, an organic EL display device and so forth. In this embodiment, it is explained when a liquid crystal display device is used as a transparent display device. FIG. 1A is a plan view of a liquid crystal display device 10. In FIG. 1A, the liquid crystal display device 10 has a display area 15 and a terminal area 16. The liquid crystal display device 10 is constituted by glass or transparent resin.

A light source 25, which supplies light to the display area 15, and a wiring substrate 26 connected to the light source 25 are mounted on the terminal area 16 of the transparent display device 10. The light source 25 in FIG. 1A is shown as a package in which a plurality of LEDs are aligned in line. In addition, the driver ICs 17, which supply signals and power to the pixels PX in the display area 15, are disposed on the terminal area 16; and the flexible wiring substrates 20 are connected to the terminal area 16 corresponding to the driver ICs 17. The flexible wiring substrates 20 are connected to the PCB (Printed Circuit Board) 30, which includes a system controller, an antenna to receive signals, and so forth. The wiring substrate 26 for the light source is connected to the PCB 30 through a connector 27. A cable 40 is connected to the PCB 30 to supply power. By the way, a plurality of flexible wiring substrates 20 exist corresponding to a plurality of driver ICs 17 in FIG. 1A, however, in other figures, they are represented by one flexible wiring substrate 20 to avoid complication of the drawings.

Figure 1B:
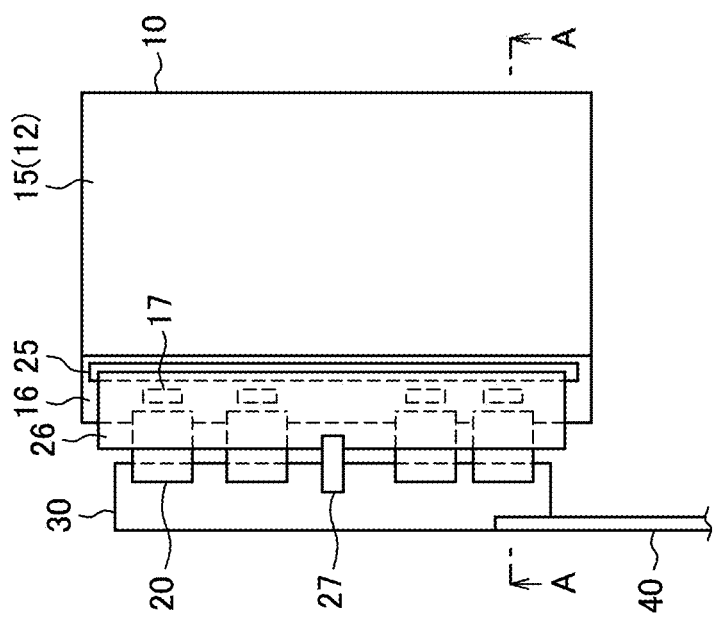
FIG. 1B is an enlarged view of a pixel of the liquid crystal display device of FIG. 1A.

FIG. 1B is a plan view of one pixel PX in the display area 15. In FIG. 1B, the pixel electrode 70 is partitioned by a scan signal line 61 and a video signal line 62, which are connected to the transistor Tr; an opening of one pixel PX approximately corresponds to the pixel electrode 70, which occupies a large area of the pixel PX; the pixel transistor Tr is disposed in very small area compared with the pixel electrode 70. A transmittance of the opening relates to a transmittance of the transparent display device; a transmittance of the liquid crystal display device 10 in a layout of the pixel shown in FIG. 1B is very high as 85 degrees, which is comparable to a transmittance of glass for a window, which is explained later.

In FIG. 1B, a pixel transistor Tr is formed at the lower left of the pixel PX. In FIG. 1B, the pixel transistor Tr is constituted from the drain electrode, the semiconductor layer 63, the source electrode 64, and the gate electrode 611; the video signal line 62 works as the drain electrode. The signal, passed through the pixel transistor Tr, is supplied to the pixel electrode 70 via the through hole 65. As shown in FIG. 1B, most of the pixel PX is occupied by transparent pixel electrode 70 as viewed in a plane, thus, the pixel PX has high transmittance.

FIG. 2 is a cross sectional view of FIG. 1A along the line A-A. In FIGS. 1A and 2, the liquid crystal display device 10 includes the liquid crystal layer 50 of molecule dispersing type liquid crystal sandwiched between the TFT substrate 11 and the counter substrate 12, and a seal material 14 to adhere the TFT substrate 11 and the counter substrate 12 to each other, and to enclose the liquid crystal layer 50. The TFT substrate 11 has a TFT wiring layer controlling the molecule dispersing type liquid crystal layer 50 and the pixel electrode 70 connected to the TFT wiring layer. The counter substrate 12 opposes to the TFT substrate 11 and has a counter electrode (common electrode) to drive the molecule dispersing type liquid crystal layer 50. A cover glass 13 is disposed on the counter substrate 12.

The TFT substrate 11 is adhered to the window glass, which is explained later, namely, the TFT substrate 11 overlaps the window glass. Both a base substrate of the TFT substrate 11 and a base substrate of the counter substrate 12 are glass substrates. In addition, the cover glass 13 is also a glass substrate; thus, the three glass substrates overlap the window glass, which is explained later. The terminal area 16 of the TFT substrate 11 is a region where the counter substrate 12 and the cover glass 13 do not overlap the TFT substrate 11; the flexible wiring substrates 20 are connected to the terminal area 16. The flexible wiring substrate 20 is connected to the driver ICs 17 mounted on the terminal area 16; the driver ICs 17 are connected to the scan signal lines 61 and the video signal lines 62 to drive pixels in the display area 15.

Among the four driver ICs 17 in FIG. 1A, two driver ICs 17 of inner side are connected to the video signal lines 62 and two driver ICs 17 of outer sides are connected to the scan signal lines 61. The LED light source 25 is disposed between the driver IC 17 and display area 16; the LED light source 25 is disposed so as to oppose to a side surface of the counter substrate 12 and a side surface of the cover glass 13; consequently, light is incident from the side surface of the counter substrate 12 and the side surface of the cover glass 13. Thus, light is supplied to the display area 15 through the counter substrate 12 and the cover glass 13 which work as a light guide. The wiring substrate 26 to drive the light source 25 is connected to the LED light source 25; and the wiring substrate 26 for the light source is connected to the PCB substrate 30 through the connecter 27.

The flexible wiring substrate 20 is connected to the PCB substrate 30, which has a system controller, an antenna and so forth; the cable 40 is connected to the PCB substrate 30 to supply power. A transparent adhesive is coated on a back side of the TFT substrate 11 of the transparent liquid crystal display device 10 in FIG. 2, then, the transparent liquid crystal display device 10 is adhered to the window glass. In FIGS. 1A and 2, the PCB substrate 30 exists, however, the PCB substrate 30 may be omitted by mounting the electronic components on the flexible wiring substrate 20 instead on the PCB substrate 30. In FIGS. 13 through 16, PCB substrate 30 is omitted.

Figure 3:
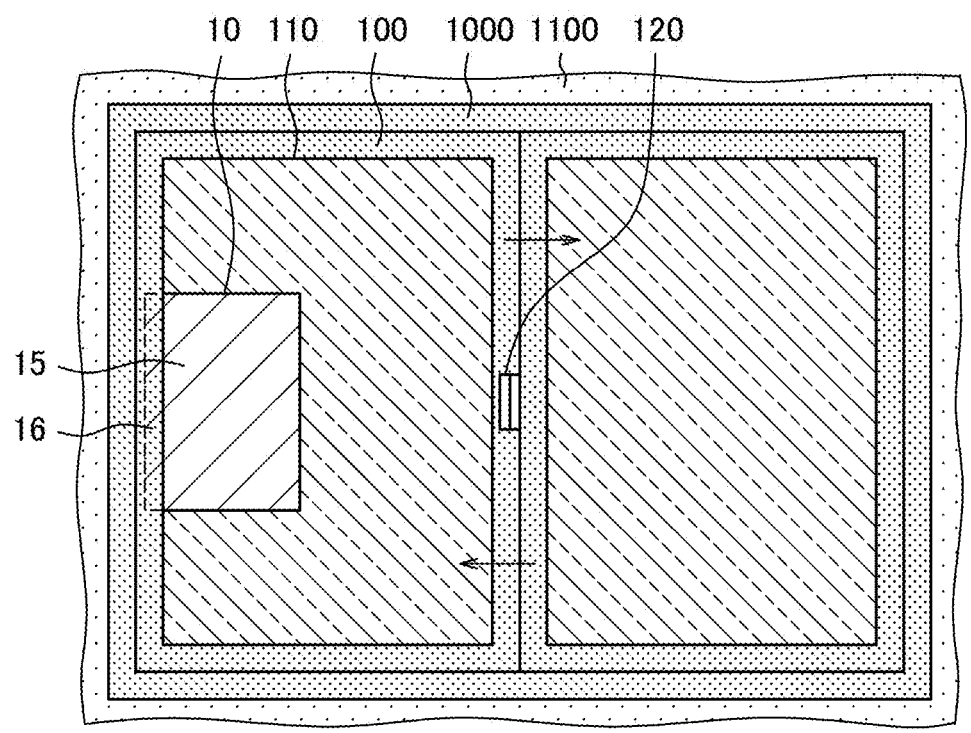
FIG. 3 is a front view in which a transparent display device is adhered to a window glass of a glass slide window.

FIG. 3 is a front view of the widow, on which the transparent display constituted by e.g. a liquid crystal display device 10 is adhered. An outer size of the transparent display device 10 is smaller than an outer size of the window glass 110. The transparent display device 10 is adhered to the window glass 110 via the transparent adhesive. The terminal area 16 of the liquid crystal display device 10 is disposed under the frame 100 of the window glass (may be simply called as frame, herein after), thus it is not visible from outside. The driver IC and the LED light source mounted on the terminal area 16 are covered by the frame 100 of the window glass 110, and are not visible from outside.

A pixel circuit in the pixel PX in the liquid crystal display device is smaller than that of the organic EL display device, therefore, the liquid crystal display device has a higher transmittance; thus, the liquid crystal display device is suitable for the transparent display device. In addition, when the liquid crystal display device is used as a transparent display device, the side light system can be taken instead of back light, which is generally set at back side of the TFT substrate 11; therefore, an opposite side can be visible through the liquid crystal display device when seen from both front and back of the liquid crystal display device; therefore, the light source of the liquid crystal display device does not deteriorate a visibility as a transparent display device.

In FIG. 3, a window frame 1000 is formed in the wall 1100. The glass slide window having a widow glass 110, the frame 100, and so forth is set in the window frame 1000. In FIG. 3, two glass windows are slide windows, which can overlap to each other by moving in the direction indicated by the arrows. The glass slide windows can be locked by a key 120.

Figure 4:
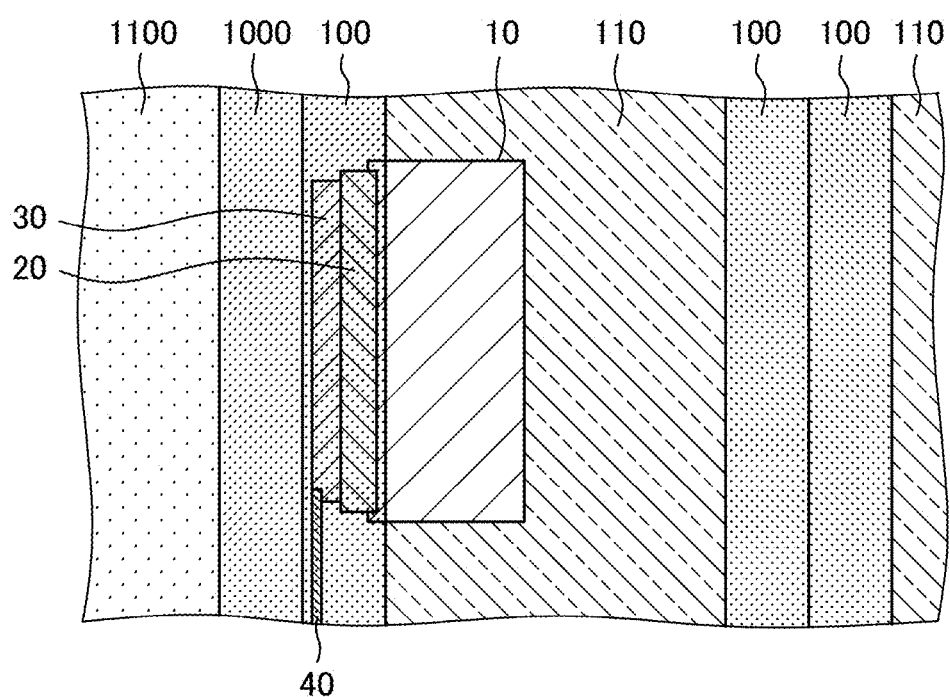
FIG. 4 is a detailed view in which a transparent display device is adhered to a window glass of the glass slide window.

FIG. 4 is a detailed front view of the glass slide window at the portion where the transparent display device 10 is disposed in FIG. 3. In FIG. 4, the liquid crystal display device 10, which is a transparent display, is adhered to the window glass 110. The display area 15 of the liquid crystal display device 10 is adhered to the window glass 110, the terminal area 16 exists under the frame 100.

The flexible wiring substrate 20 is connected to the terminal area 16; the wiring substrate 26 for the light source is connected to the LED light source disposed on the terminal area 16; the flexible wiring substrate 20 and the wiring substrate 26 for the light source are connected to the PCB substrate 30. In FIG. 4, however, the LED light source 25 and the wiring substrate 26 for the light source are not depicted. The flexible wiring substrates 20 are represented by one piece of flexile wiring substrate 20, which is the same for the drawings herein after.

The cable 40 is connected to the PCB substrate 30 for supplying power. The flexible wiring substrate 20, the PCB substrate 30, cable 40 are all covered by the frame 100, therefore, they do not influence a visibility of the transparent display device. The problem of the structure of FIG. 4 is how to supply power to the cable 40.

Figure 5:
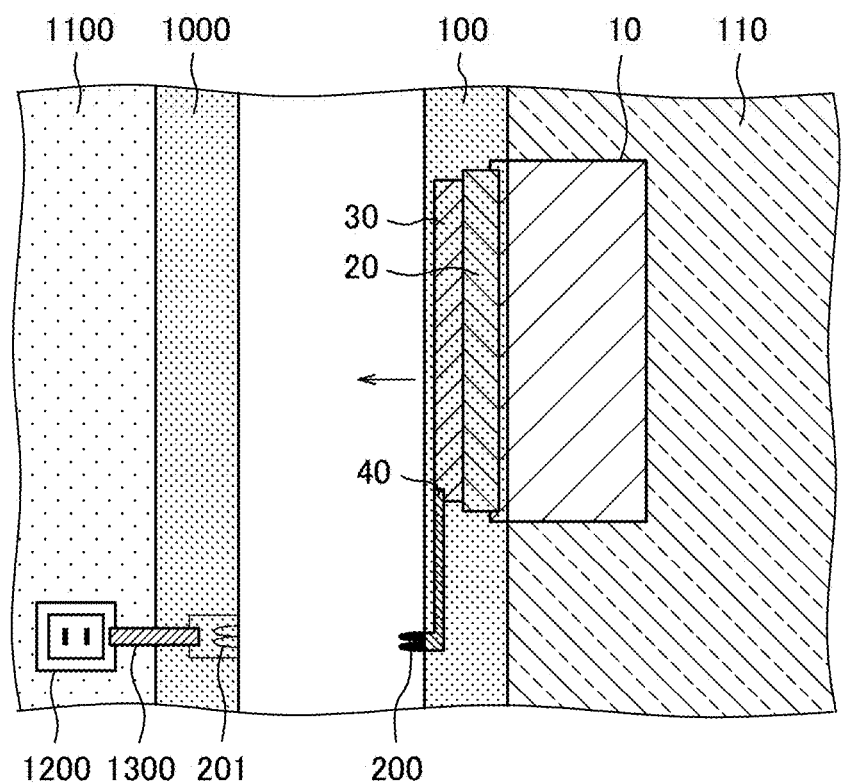
FIG. 5 is a front view of power supplying structure according to embodiment 1.

FIG. 5 is a front view which shows a structure of power supply according to embodiment 1. Embodiment 1 uses the male terminal 200 mounted in the frame 100 of the glass side window and the female terminal 201 mounted in the window frame 1000 to supply power to the transparent display device 10. In the frame 100 of the glass slide window, the cable 40 is connected to the male terminal 200. On the other hand, the female terminal 201 is installed in the window frame 1000. The female terminal 201 is connected to the outlet 1200 through the power cable 1300.

In the structure of FIG. 5, when the glass slide window is open, the male terminal 200 and the female terminal 201 are not connected to each other, thus, the transparent display 10 is OFF. In FIG. 5, when the window is closed by moving the glass slide door to the left, the male terminal 200 and the female terminal 201 are connected to each other, then power is supplied to the transparent display device 10, thus, the transparent display 10 becomes ON state. Some locking means is preferably provided for the male terminal 200 or female terminal 201 to avoid unstable electrical connection.

Figure 6:
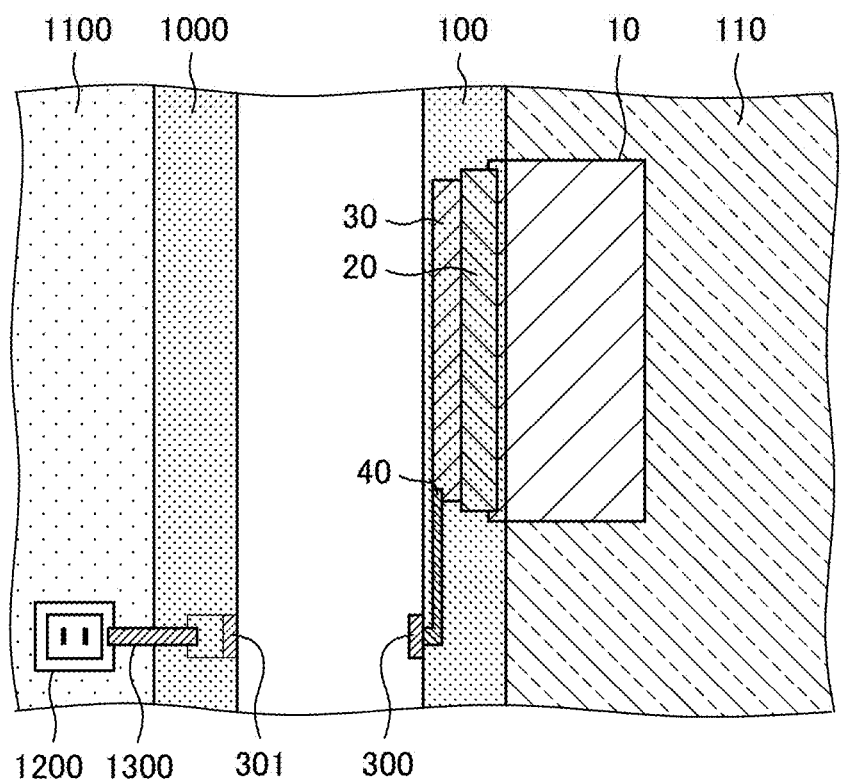
FIG. 6 is a front view in which magnets are attached to the receiving terminal and the power supplying terminal.

FIG. 6 is a front view of the second example of embodiment 1. FIG. 6 is different from FIG. 5 in that the male terminal 300 and the female terminal 301 contain magnets to attract to each other to supply power for the transparent display device 10. Other structures of FIG. 6 is the same as FIG. 5. In FIG. 6, the male terminal 300 including a magnet is provided in the frame 100 of the glass slide window; the female terminal 301 including another magnet is provided in the window frame 1000. The pole of the magnet installed in the male terminal 300 and the pole of the magnet installed in the female terminal 301 are chosen so that the two magnets attract to each other.

In the structure of FIG. 6, since the male terminal and the female terminal attract to each other, reliability of connection is further improved. In the structure of FIG. 6, too, power is not supplied to the transparent display device 10 when the glass slide window is open; power is supplied to the transparent display device 10 when the glass slide window is closed, thus the transparent display device 10 can display images.

Embodiment 2

Figure 7:
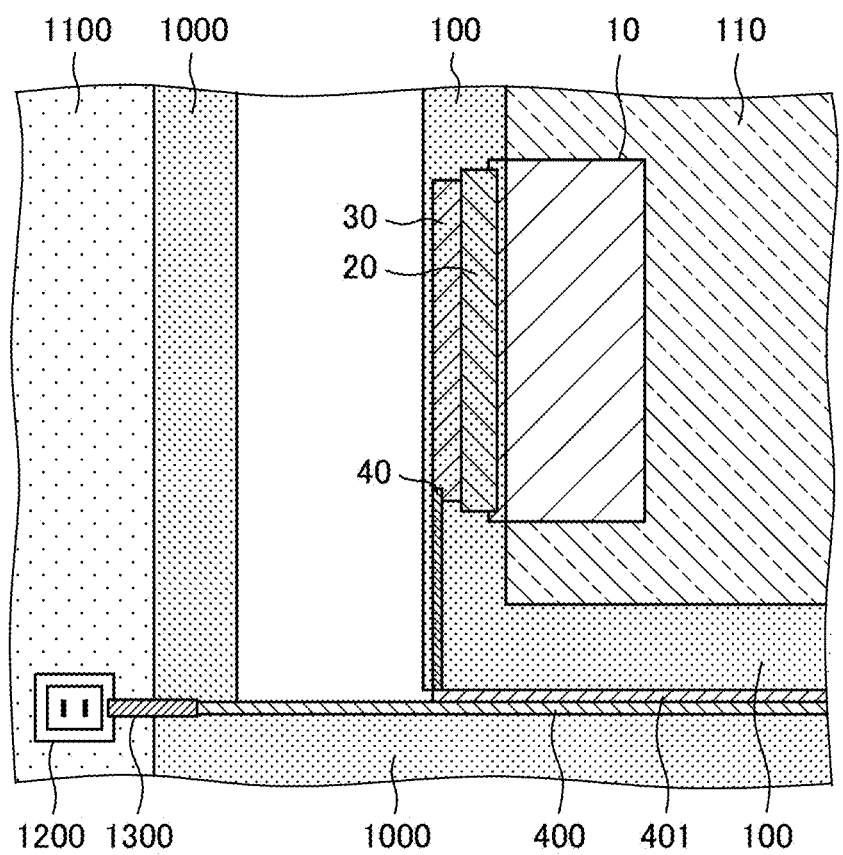
FIG. 7 is a front view of power supplying structure according to embodiment 2.

FIG. 7 is a front view of the glass window according to embodiment 2. In FIG. 7, the transparent display device 10 is adhered to the window glass 110; the terminal area of the transparent display device 10, the flexible wiring substrate 20, the PCB substrate 30, and the cable 40 are disposed under the frame 10 of the glass slide window as the same as embodiment 1. In FIG. 7, the rail 400, which is connected to a power cable 1300, is provided in the window frame 1000. The rail 400 works as a power supply terminal in embodiment 2.

The structure of the rail 400 in FIG. 7 has two rails which are formed in parallel so that current can flow. In FIG. 7, the slider 401 is formed on the glass slide window. The slider 401 can be called as a receiving terminal. The slider 401 is constituted by a first slider and a second slider; the first slider electrically connects to the first rail, and the second slider electrically connects to the second rail; the first slider and the second slider are connected to the cable 40. In the meantime, the slider 401 is not necessarily a rail shape, but it can have a structure as to be pressed to the first rail and to the second rail by sprig force.

Power is always supplied to the rail, consequently, power can always be supplied to the transparent display device 10; therefore, the transparent display device 10 can display images even when the glass slide window is open in the structure of embodiment 2. Even power is always supplied to the rail 400, an electric shock can be avoided by making the structure of the rail 400 as similar to so called a light duct.

Although the rail 400 is disposed on the bottom side of the window frame 1000 in FIG. 7, the rail 400 can be set on the top side of the window frame 1000. In this case, the cable 40 from the transparent display device 10 is connected to the rail 400 disposed on the top side of the window frame 1000. In this case, too, two rails are provided at the top side of the window frame 1000, and, two sliders are provided on the top side of the frame 100 of the glass slide window.

If it is structurally difficult to dispose two rails on the top side or the bottom side of the window frame 1000, or to dispose two sliders 401 on one side of the glass slide window, a first rail can be disposed on the bottom side of the window frame 1000 and a second rail can be disposed on the top side of the window frame 1000. In this case, a first slider is disposed on the bottom side of the glass slide window, and a second slider is disposed on the top side of the glass slide window. Power is supplied to the cable 40, which is connected to the transparent display device 10, through the top side and the bottom side of the glass slide window.

Embodiment 3

Figure 8:
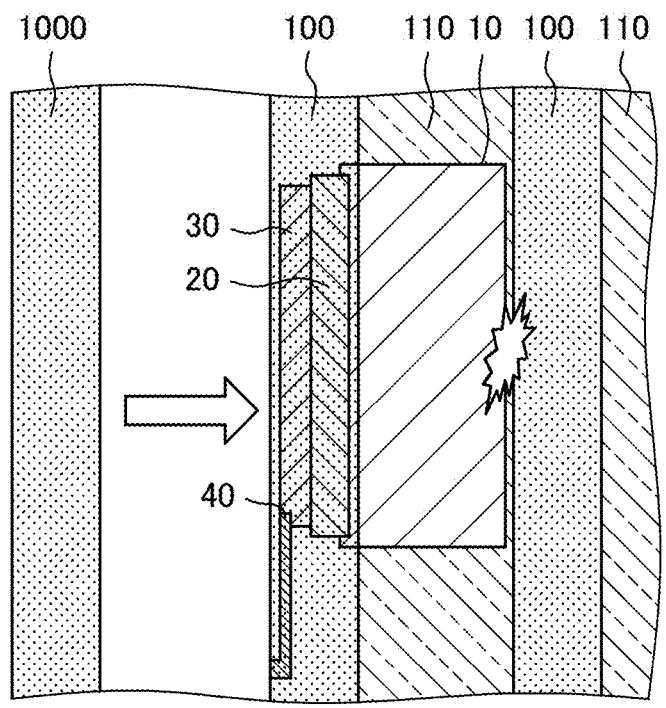
FIG. 8 is a front view which shows a problem to be solved by embodiment 3.

When the transparent display device 10 is adhered to a window glass 110 of a first glass slide window, there is a risk that the transparent display device 10 is caught by another glass slide window (second glass slide window) when either one of the glass slide windows is moved and overlap to each other to open the window. FIG. 8 is a schematic front view to depict this risk.

Figure 9:
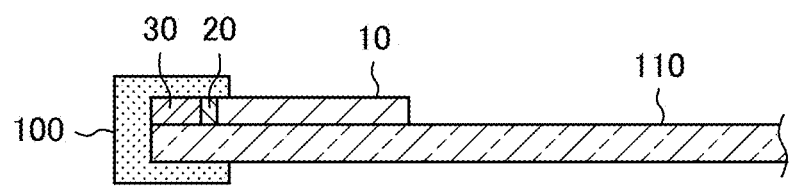
FIG. 9 is a cross sectional view of a structure before applying embodiment 3.

FIG. 9 is a cross sectional view in which the transparent display device 10 is adhered to the window glass 110 of the first glass slide window; the structure 9 has a risk depicted by FIG. 8. In FIG. 9, a display area of the display device 10 is adhered to the glass window; the terminal area of the transparent display device 10, the flexible wiring substrate 20, and the PCB substrate 30 are housed in the frame 100. In FIG. 9, if a tip of the transparent display device 10 rises for some reason, there arises a risk that the transparent display device 10 is caught by another glass slide window as depicted by FIG. 8.

Figure 10:
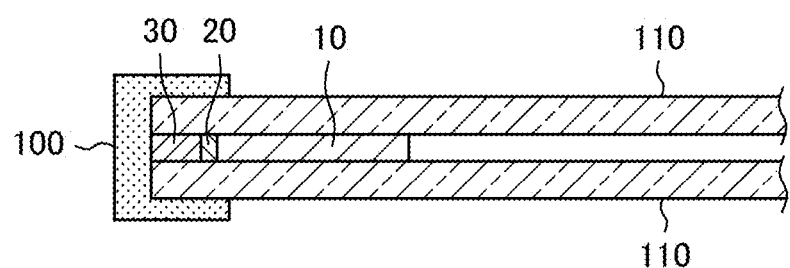
FIG. 10 is a cross sectional view of a first example of embodiment 3.

FIG. 10 is a cross sectional view of a first example of the present embodiment to avoid this problem. In FIG. 10, the glass window 110 has a two sheet structure, the transparent display device 10 is disposed between the first glass substrate 110 and the second glass substrate 110. The transparent display device 10 adheres to one of the first glass substrate 110 and the second glass substrate 110, or adhered to both the first glass substrate 110 and the second glass substrate 110. In such a structure, a risk that a tip of the transparent display device 10 rises can be avoided; and thus, a risk that the transparent display device 10 is caught by another glass slide window as shown FIG. 8 can be avoided.

By the way, a room can have a good temperature keeping effect by making the window glass 110 in two sheet structure. On the other hand, when the two window glass sheets 110 are adhered to each other by transparent adhesive, the window glass 110 can be mechanically strong.

Figure 11:
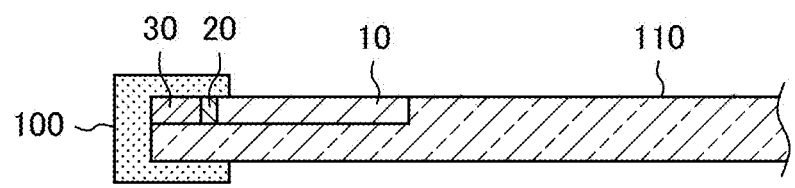
FIG. 11 is a cross sectional view of a second example of embodiment 3.

FIG. 11 is a cross sectional view of a second example of the present embodiment. In FIG. 11, a part of the window glass 110 is made thin by e.g. etching; the transparent display device 10 is fit in in this thin portion. Since the transparent display device 10 is very thin, the amount of etching of the glass window 110 can be small amount. In this structure, the surface of the transparent display device 10 can be the same level as other surface of the glass window 110.

Alternatively, a rise of the tip of the transparent display device 10 can be securely avoided by the following configuration; the window glass 110 is etched deeper than the thickness of the transparent display device 10 and then applying resin to the surface of the transparent display device 10 to make the surface as the same level as other portion of the window glass 110.

Figure 12A:
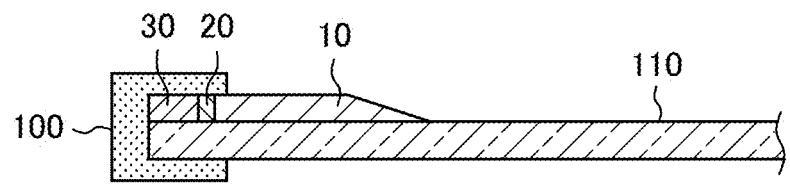
FIG. 12A is a cross sectional view of a third example of embodiment 1.

FIG. 12A is a cross sectional view of a third example of the present embodiment. In FIG. 12A, a thickness of the transparent display device 10 becomes thinner in going to a tip. Since certain thickness is necessary to form a display area 15 of the transparent display device 10, a portion of thinner thickness near the tip is made a dummy area. The structure of the transparent display device 10 of FIG. 12A can prevent a rise of the tip, thus the caught of the transparent display device 10 by another glass widow as shown in FIG. 8 can be avoided. Other structures of FIG. 12A are the same as FIG. 9.

Figure 12B:
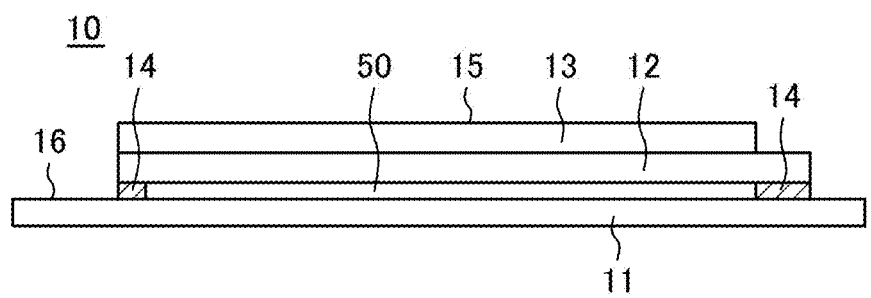
FIG. 12B is a cross sectional view of concrete configuration to realize a structure of FIG. 12A.
Figure 12C:
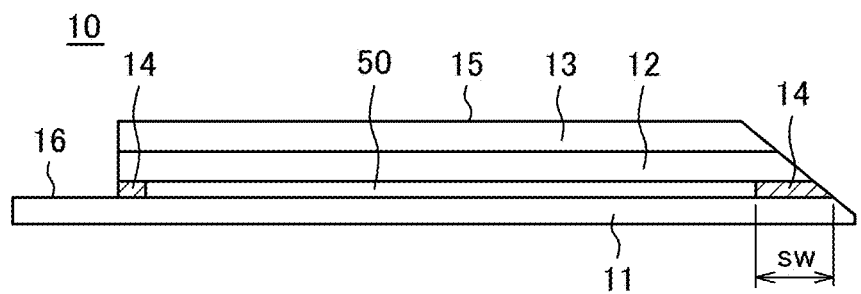
FIG. 12C is another cross sectional view of concrete configuration to realize a structure of FIG. 12A.

FIG. 12B is a cross sectional view of an example to make a thickness of the transparent display device 10 gradually thinner. In FIG. 12B, at the vicinity of the right tip, in the horizontal direction, the TFT substrate 11 is largest followed by the counter substrate 12, and by the cover glass 13. Thus, actually, a thickness of the transparent display device 10 can be made gradually thinner. FIG. 12C is a cross sectional view of another example to make a thickness of the transparent display device 10 gradually thinner. In FIG. 12C, a width of the seal material 14 is made larger at the right edge of the transparent display device 10 than other portions; the thickness of the right tip of the transparent display device 10 can be gradually changed by grinding the corresponding portion as forming a chamfer.

Embodiment 4

Figure 13:
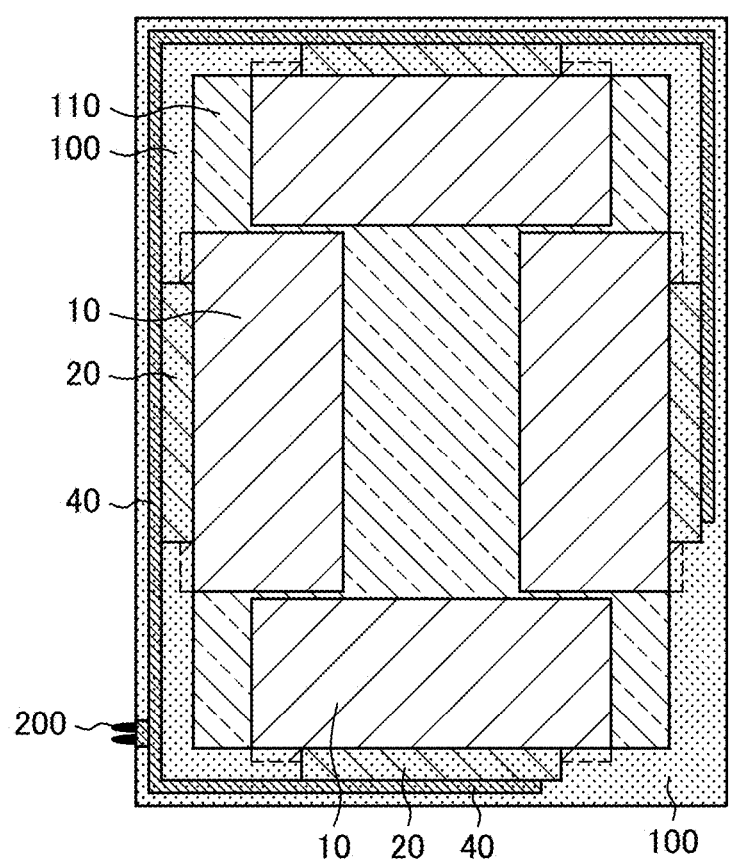
FIG. 13 is a front view of a glass slide window before the structure of embodiment 4 is applied.

There can be a need that a plurality of transparent display devices 10 are disposed on one window glass 110. FIG. 13 is a front view in which four transparent display devices 10 are disposed on one window glass 110. Each of the transparent display devices 10 can display its own images. In each of the transparent display devices 10, the display area is adhered to the window glass 110 and the terminal area is disposed under the frame 100. The flexible wiring substrate 20 is connected to the terminal area, each of the flexible wiring substrates 20 is connected to the cable 40. In FIG. 13, the light source 25, the flexible wiring substrate 26 for the light source, the PCB 30, and the like are omitted, and all of them are represented by flexible wiring substrate 20 to avoid a complication of the drawing. It is the same for all other drawings herein after.

In FIG. 13, it is necessary to supply power to individual display device 10 through the cable 40. In the structure of 13, when a part of the cable 40 is broken, at least one display device cannot display images.

Figure 14:
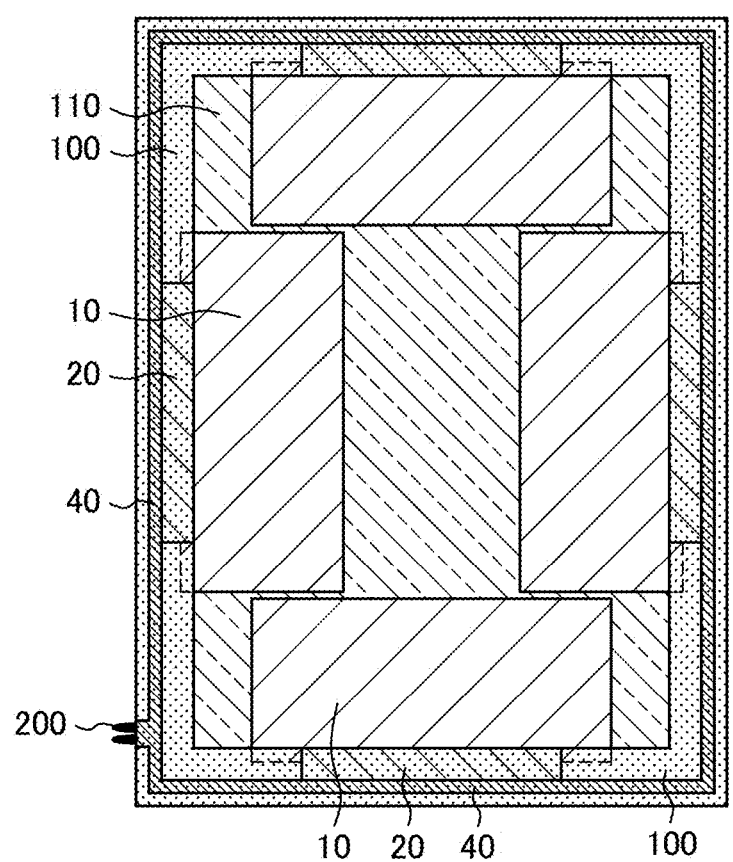
FIG. 14 is a front view of a glass slide window according to embodiment 4.

FIG. 14 is a front view of the glass slide window of embodiment 4, which countermeasure the problem. FIG. 14 differs from FIG. 13 in that the cable 40 to supply power to each of the display devices 10 is formed in loop all around under the frame 100. In this structure, power can be supplied to all the transparent display devices 10 even any one portion of the cable 40 is broken. Therefore, a reliability of the display system is improved. Other structures of FIG. 14 are the same as that of FIG. 13, therefore, explanation is omitted.

Embodiment 5

Figure 15:
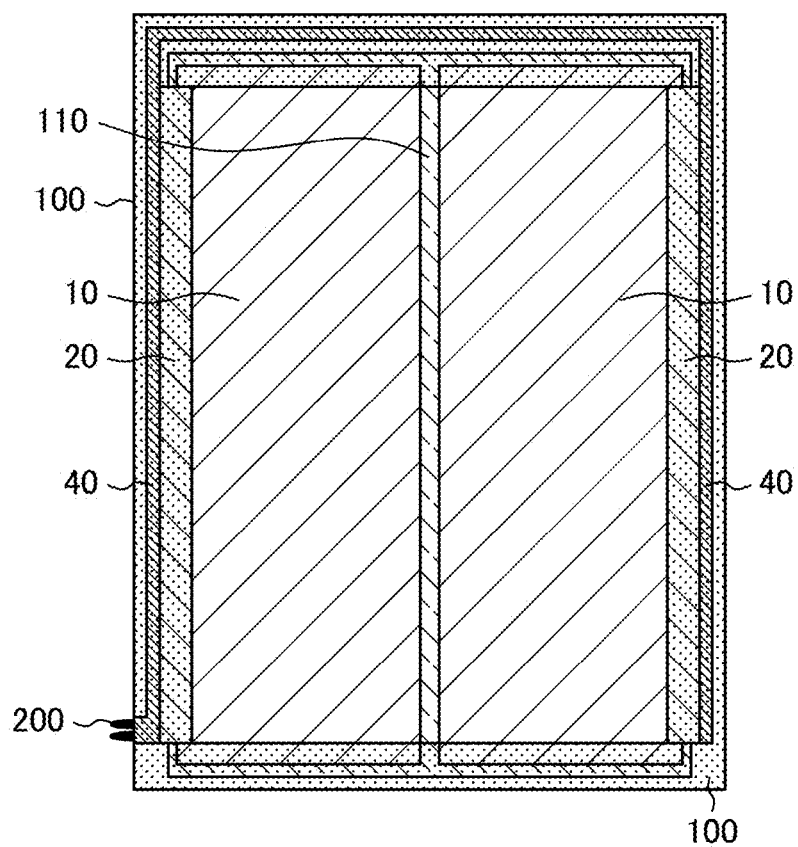
FIG. 15 is a front view of a glass slide window before the structure of embodiment 5 is applied.

FIG. 15 is a front view in which two transparent display devices 10 are disposed on the window glass 110. The display area of each of the transparent display devices 10 is adhered to the window glass 110; the terminal area of the transparent display devices 10, flexible wiring substrate 20, cable 40 and so forth are disposed under the frame 100. In FIG. 15, too, PCB substrate 30 and the like are omitted; it is the same in other figures.

The display area of each of the transparent display devices 10 has nearly half of the area of the window glass 110; there is a narrow stripe region in which the display device 10 does not exist between the display areas of the two transparent display devices 10. This stripe region, in which the transparent display device 10 does not exist, may give an impression of light leak and may deteriorate the display quality.

Figure 16:
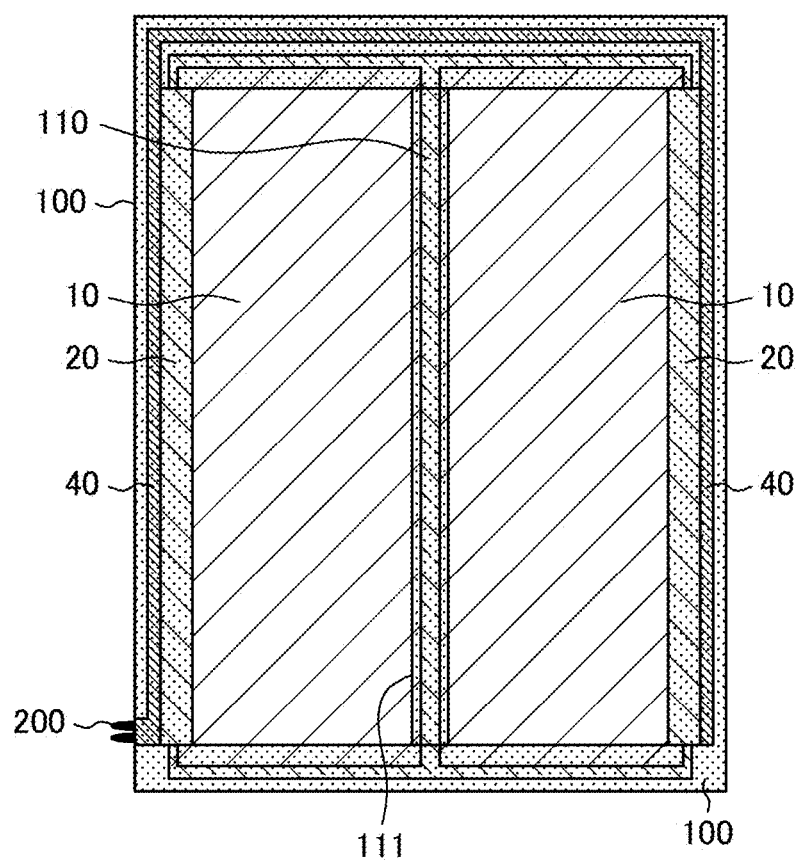
FIG. 16 is a front view of a glass slide window according to embodiment 5.

FIG. 16 is a front view of the glass slide window of embodiment 5, which countermeasures this problem. In FIG. 16, too, as in FIG. 15, most of the window glass is occupied by two transparent display devices 10, and there is a narrow stripe region in which the display devices 10 does not exist at the center of the window glass. FIG. 16 differs from FIG. 15 in that a dummy frame 111 is formed covering the narrow stripe region in which the display device 10 does not exist. An appearance of the dummy frame 111 is the same as the frame 100, which surrounds the window glass 110. Thus, the light leak can be avoided without deterioration of design quality and deterioration of display quality can be avoided. Other structures of FIG. 16 are the same as FIG. 15.

In FIG. 15, a space of the vertical stripe region is formed between the two transparent display devices 10 since the two transparent display devices 10 are aligned in lateral direction. When the two transparent display devices 10 are aligned in vertical direction, the space between the two transparent display devices 10 becomes a horizontal stripe. In this case, a dummy frame 111 becomes a horizontal stripe.

Figure 17:
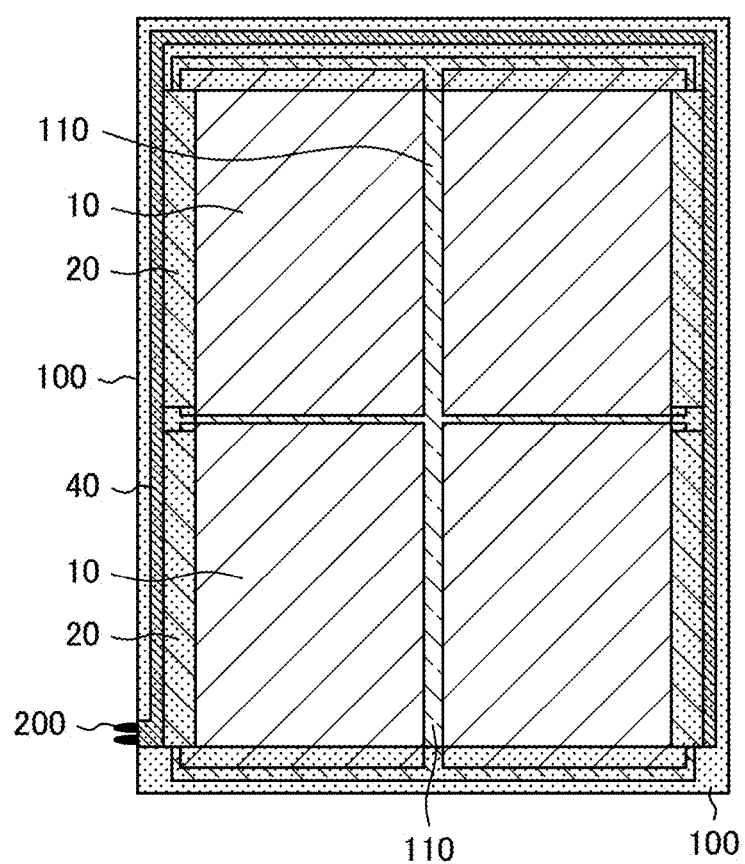
FIG. 17 is a front view of a glass slide window according to another example of embodiment 5.

FIG. 17 is a front view in which four transparent display devices 10 are disposed on the window glass 110. The display area of each of the four transparent display devices 10 is adhered to the window glass 110; the terminal area of the transparent display device 10, the flexible wiring substrate 20, the cable 40 and so forth are disposed under the frame 100. In FIG. 17, too, the PCB substrate 30 and the like are omitted.

The display area of each of the display devices 10 has nearly a quarter of the area of the window glass 110; there is a narrow vertical stripe region and a narrow horizontal stripe region in which the display device 10 does not exist. This vertical and horizontal stripe regions, in which the transparent display device 10 does not exist, may give an impression of light leak and may deteriorate the display quality.

Figure 18:
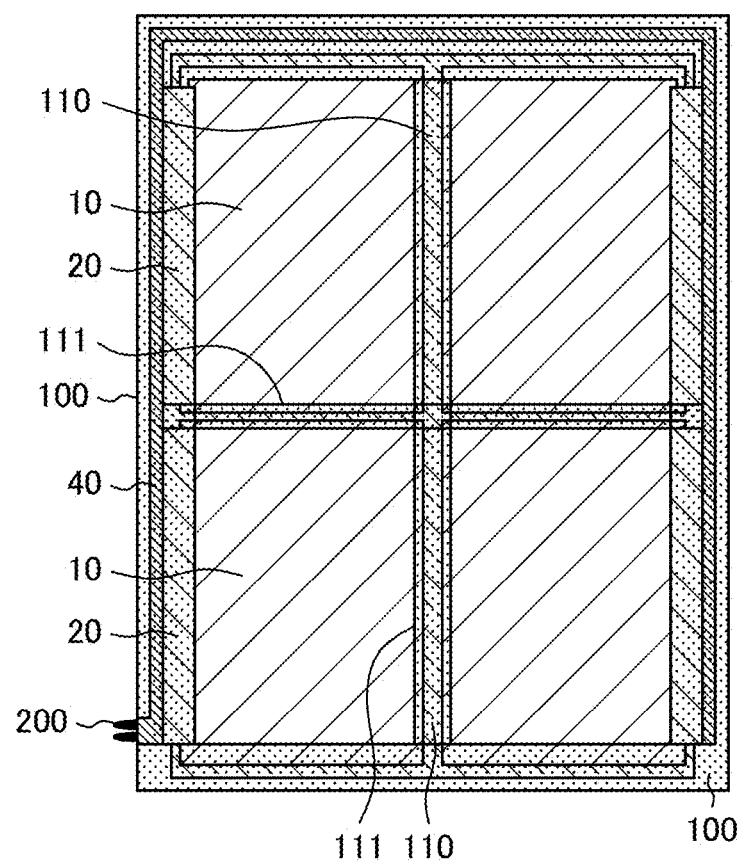
FIG. 18 is a front view of a glass slide window according to yet another example of embodiment 5.

FIG. 18 is a front view of the glass slide window of a second example of embodiment 5, which countermeasures the above problem. In FIG. 18, too, as in FIG. 17, most of the window glass 110 is occupied by four transparent display devices 10, and there is a narrow vertical stripe region and a narrow horizontal stripe region in which the display device 10 does not exist. FIG. 18 differs from FIG. 17 in that a dummy frame 111 is formed covering the narrow vertical stripe region and the narrow horizontal stripe region in which the display device 10 does not exist. An appearance of the dummy frame 111 is the same as the frame 100, which surrounds the window glass 110. Thus, the light leak can be avoided without deterioration of design quality and deterioration of display quality can be avoided. Other structures of FIG. 18 is the same as FIG. 17.

In the above embodiments, the means to supply power to the transparent display device 10, which is adhered to the window glass 110, has been explained. The liquid crystal display device has been chosen as a transparent display device 10 in the embodiments; however, the transparent display device can be constituted not only by the liquid crystal display device but also can be constituted by an organic EL display device, however, the structure for supplying power is basically the same between them.

A difference in transparency between the organic EL display device and the window glass is rather large, thus there is a possibility that visibility is decreased; however, unlike the liquid crystal display device, the organic EL display device does not need a back light, therefore, it is superior in manufacturing cost in this point. The structures of embodiments 1 to 5 can be used as a power supplying means when one of a vibration sensor, a surveillance camera, and the like is attached to the glass slide window.

Further, non-contact power supply means can be used in the power supply means explained in embodiments 1 and 2. For example, means of electro-magnetic coupling for supplying power can be applied instead of the male terminal or the female terminal in embodiment 1. In this case, as in embodiment 1, power cannot be supplied to the transparent display device 10 when the glass slide window is open.

What is claimed is:

1. A power supplying structure for a transparent liquid crystal display device attached to a glass slide window which has a first window glass and a first frame surrounding the first window glass,
   the glass slide window being disposed in a window frame,
   wherein a display area of the transparent liquid crystal display device overlaps the first window glass,
   an external dimension of the display area of the transparent liquid crystal display device is smaller than an external dimension of the first window glass,
   a light source for supplying light to the display area, a terminal area of the transparent liquid crystal display device, a wiring substrate, and a cable connecting to the wiring substrate are housed in the first frame,
   the cable connects to a receiving terminal formed in the frame,
   the receiving terminal is capable of connecting to a power supplying terminal formed in the window frame,
   the power supplying terminal connects to a power source,
   the power supplying terminal is a rail with a structure of two rails formed in parallel, and
   each of the two rails are electrically connected to two sliders which are electrically connected to the cable.

2. The power supplying structure according to claim 1, wherein a first magnet is attached to the receiving terminal,
   a second magnet is attached to the power supplying terminal, and
   a polarity of the first terminal and a polarity of the second terminal are arranged as that the first magnet and the second magnet attract to each other.

3. The power supplying structure according to claim 1, wherein the receiving terminal is a male terminal, and
   the power supplying terminal is a female terminal.

4. The power supplying structure according to claim 1, wherein a thickness of the transparent liquid crystal display device becomes thinner in going to an edge in an opposite direction from the terminal area in a cross sectional view parallel to a sliding direction of the glass slide window.

5. The power supplying structure according to claim 1, wherein a thickness of the first window glass on which the transparent liquid crystal display device is adhered is thinner than a thickness of other area of the first window glass.

6. The power supplying structure according to claim 1, wherein the transparent liquid crystal display device is overlapped by a second window glass.

7. The power supplying structure according to claim 6, wherein a space between the first window glass and the second widow glass is empty except an area the transparent liquid crystal display device exists.

8. The power supplying structure according to claim 6, wherein transparent resin is filled in a space between the first window glass and the second widow glass except an area the transparent liquid crystal display device exists.

9. A power supplying structure in which a glass slide window having a window glass and a first frame surrounding the window glass is disposed in a window frame,
   a plurality of display areas of transparent liquid crystal display devices are adhered to the window glass,
   terminal areas of the transparent liquid crystal display devices, wiring substrates, and a cable connecting to the wiring substrates are housed in the first frame,
   the cable is formed as a continuous loop in the first frame, the cable connects to a receiving terminal disposed in the first frame, the receiving terminal connects to a power supplying terminal disposed in the window frame, the power supplying terminal connects to a power source, the power supplying terminal is a rail with a structure of two rails formed in parallel, and each of the two rails are electrically connected to two sliders which are electrically connected to the cable.

10. The power supplying structure according to claim 9, wherein the plurality of the display areas of the transparent liquid crystal display devices are adhered to the window glass with a certain space to each other, and the certain space is covered by a dummy frame.

11. The power supplying structure according to claim 10, wherein a shape of the dummy frame is a horizontal stripe or a vertical stripe.

12. The power supplying structure according to claim 10, wherein a shape of the dummy frame is a cross shape.

13. The power supplying structure according to claim 10, wherein a material of the dummy frame is same as the first frame.

\* \* \* \* \*